(12) United States Patent
Pattaswamy et al.

(10) Patent No.: US 8,725,212 B2
(45) Date of Patent: May 13, 2014

(54) VIRTUAL MODEM SUSPENSION HANDLER IN MULTIPLE SIM USER EQUIPMENT

(75) Inventors: Giridhar Pattaswamy, Bracknell (GB); Navin K. Karra, Bracknell (GB); Abhishek Pandit, Wokingham (GB); Stephen J. Richards, Maidenhead (GB)

(73) Assignee: Broadcom Corporation, Irvine, CA (US)

( * ) Notice: Subject to any disclaimer, the term of this patent is extended or adjusted under 35 U.S.C. 154(b) by 113 days.

(21) Appl. No.: 13/480,238

(22) Filed: May 24, 2012

(65) Prior Publication Data

US 2013/0150126 A1 Jun. 13, 2013

Related U.S. Application Data

(60) Provisional application No. 61/569,621, filed on Dec. 12, 2011, provisional application No. 61/587,521, filed on Jan. 17, 2012, provisional application No. 61/595,546, filed on Feb. 6, 2012.

(51) Int. Cl.
*H04M 1/00* (2006.01)
*H04B 1/38* (2006.01)

(52) U.S. Cl.
USPC .......................................................... 455/558

(58) Field of Classification Search
USPC ............................ 455/550.1, 552.1, 557, 558
See application file for complete search history.

(56) References Cited

U.S. PATENT DOCUMENTS

| 2010/0304782 | A1 | 12/2010 | Chang et al. | |
| 2011/0117909 | A1 | 5/2011 | Cao et al. | |
| 2011/0117962 | A1* | 5/2011 | Qiu et al. | 455/558 |
| 2012/0083315 | A1* | 4/2012 | Kawakishi et al. | 455/558 |

FOREIGN PATENT DOCUMENTS

| EP | 1981224 A1 | 10/2008 |
| EP | 2028909 A1 | 2/2009 |
| WO | WO 2011/109750 A1 | 9/2011 |

OTHER PUBLICATIONS

European Search Report, App. No. 12007905.8-1854, dated May 2, 2013.

* cited by examiner

*Primary Examiner* — Nguyen Vo
(74) *Attorney, Agent, or Firm* — Brinks Gilson & Lione

(57) ABSTRACT

User equipment with multiple subscriber identity modules (SIMs) includes techniques for intelligently allowing the SIMs to access the radio resources. In one aspect, the techniques determine whether a network signaling criteria is satisfied. When the network signaling criteria is satisfied, the user equipment may communicate a signaling connection release indication to a network controller handling a first SIM network connection. When the network signaling criteria is not satisfied, however, the user equipment may forgo communicating the signaling connection release indication to the network controller handing the first SIM network connection. In either case, the user equipment may locally deactivate the first SIM network connection so that the radio frequency interface may be transitioned to a second SIM.

20 Claims, 7 Drawing Sheets

VIRTUAL MODEM SUSPENSION HANDLER IN MULTIPLE SIM USER EQUIPMENT

CROSS REFERENCE TO RELATED APPLICATIONS

This application claims the benefit of priority to the following U.S. provisional patent applications: U.S. Patent Application No. 61/569,621, filed 12 Dec. 2011; U.S. Patent Application No. 61/587,521, filed 17 Jan. 2012; and U.S. Patent Application No. 61/595,546, filed 6 Feb. 2012.

TECHNICAL FIELD

This disclosure relates to communication devices with multiple Subscriber Identity Modules (SIMs). The disclosure also relates to suspension and resumption of virtual modems that handle a variety of radio access technologies (RATs).

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Relatively recently, cellular phone manufactures have introduced phone designs that include multiple SIM cards. Each SIM card facilitates a separate connection to the same network or different networks. As a result, the SIMs provide the owner of the phone with, for example, two different phone numbers handled by the same phone hardware. Accordingly, the multiple SIM approach alleviates to some degree the need to carry different physical phones, and improvements in multiple SIM communication devices will continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below refers to user equipment. User equipment may take many different forms and have many different functions. As one example, user equipment may be a cellular phone capable of making and receiving wireless phone calls. The user equipment may also be a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion below addresses how to manage virtual modems compatible with potentially many radio access technologies (RATs) in user equipment that includes one or more subscriber identity modules (SIMs). RATs may include technologies that arise from UMTS, 3GPP, GSM® Association, Long Term Evolution™ efforts, or other partnerships, associations, or standards bodies, including 2G, 3G, and 4G/LET RATs.

Figure 1:
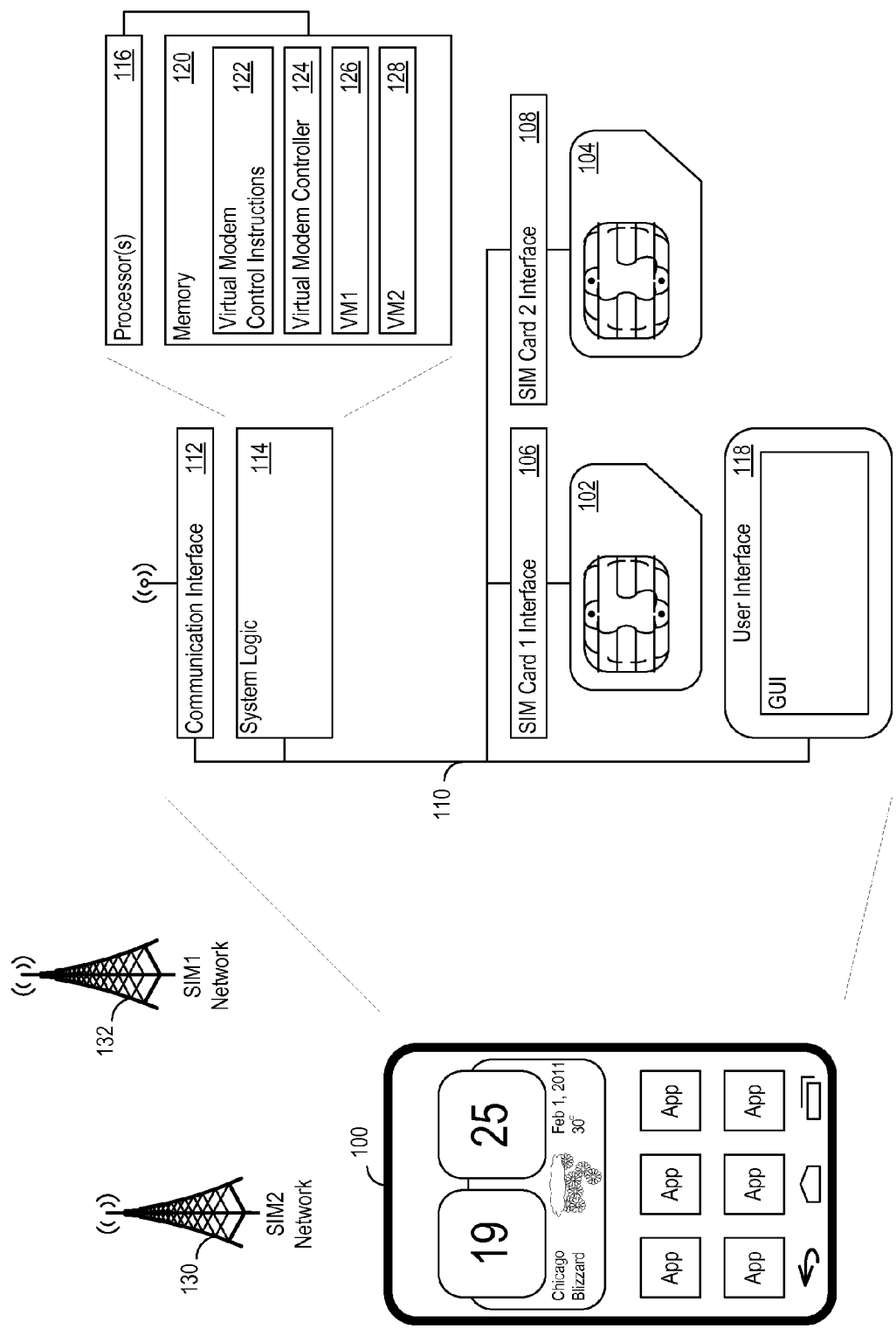
FIG. 1 shows an example of user equipment with multiple SIMs.

FIG. 1 shows an example of user equipment 100 with multiple SIMs, in this example the SIM1 102 and the SIM2 104. An electrical and physical interface 106 connects SIM1 102 to the rest of the user equipment hardware, for example, to the system bus 110. Similarly, an electrical and physical interface 108 connects the SIM2 to the system bus 110.

The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the user equipment 100.

In one implementation, the system logic 114 includes one or more processors 116 and a memory 120. The memory 120 stores data and stores instructions that the processor 116 executes to accomplish any desired functionality. SIM1 102 and SIM2 104 may be on the same or different networks, and may be served by the same or different cells. For example, the Node B 130 may manage a particular cell to which SIM1 102 is connected, while the Node B 132 may manage a different cell to which SIM2 104 is connected. Accordingly, a circuit switched (CS) or a packet switched (PS) network connection may be established for each of SIM1 and SIM2 independently. The Node Bs 130 and 132 may be UMTS network base stations, for example.

The system logic 114 may include logic that facilitates, as examples, running applications, accepting user inputs, receiving and displaying global positioning information, saving and retrieving application data, establishing, maintaining, and terminating cellular phone calls, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, power amplifiers, low noise amplifiers, coders/decoders, waveform shaping circuitry, phase locked loops (PLLs), clock generators, analog to digital and digital to analog converters and/or other logic for transmitting and receiving through one or more antennas, or through a physical (e.g., wireline) medium. As one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC)

baseband smartphone processer. These integrated circuits, as well as other hardware and software implementation options for the user equipment 100, are available from Broadcom Corporation of Irvine Calif.

The transmitted and received signals may adhere to any of a diverse array of formats, protocols, modulations, frequency channels, bit rates, and encodings. As one specific example, the communication interface 112 may support transmission and reception under the Universal Mobile Telecommunications System (UMTS). The techniques described below, however, are applicable to other communications technologies regardless of whether they arise from the 3rd Generation Partnership Project (3GPP), GSM® Association, Long Term Evolution (LTE)™ efforts, or other partnerships, associations, or standards bodies.

The system logic 114 may facilitate suspension and resumption of virtual modems that handle a variety of radio access technologies (RATs). In one implementation, the system logic 114 includes the virtual modem control instructions (control instructions) 122. The control instructions 122 may implement a virtual modem controller 124 that manages any number of virtual modems (VMs). For example, the virtual modem controller 124 may manage VM1 126 that handles network connections for SIM 1 102, and manage VM2 128 that handles network connections for SIM 2 104.

A virtual modem may refer to a software implementation of physical resources of the user equipment 100, for example through a software virtualization of the hardware. As described above with respect to the communication interface 112, the user equipment 100 may include one or more sets of physical baseband or RF resources, such as coders/decoders, modulators, amplifiers, and antennas. A virtual modem may represent a software virtualization of any of the resources in the RF path in the communication interface 112. Accordingly, each SIM of the user equipment 100 may be assigned a virtual modem, and thus recognize and use the virtualized communication resources of the virtual modem to communicate across a network, without the need to understand or deal with the complexities that may arise from sharing, e.g., a single set of RF path hardware between multiple SIMs. A separate virtual modem may be instantiated and assigned to each SIM to communicate across a network associated with a respective SIM. Said another way, multiple virtual modems may share a common set of physical communication resources of the user equipment 100, with the virtual modems managed and controlled by virtual modem logic, such as the virtual modem controller 123, which may be implemented in hardware, software, or both. The virtual modem logic, as one example, may schedule or otherwise manage access to the RF path hardware for each SIM, as well as respond to requests made by the virtual modems for access to the RF path resources for their particular SIM.

Figure 2:
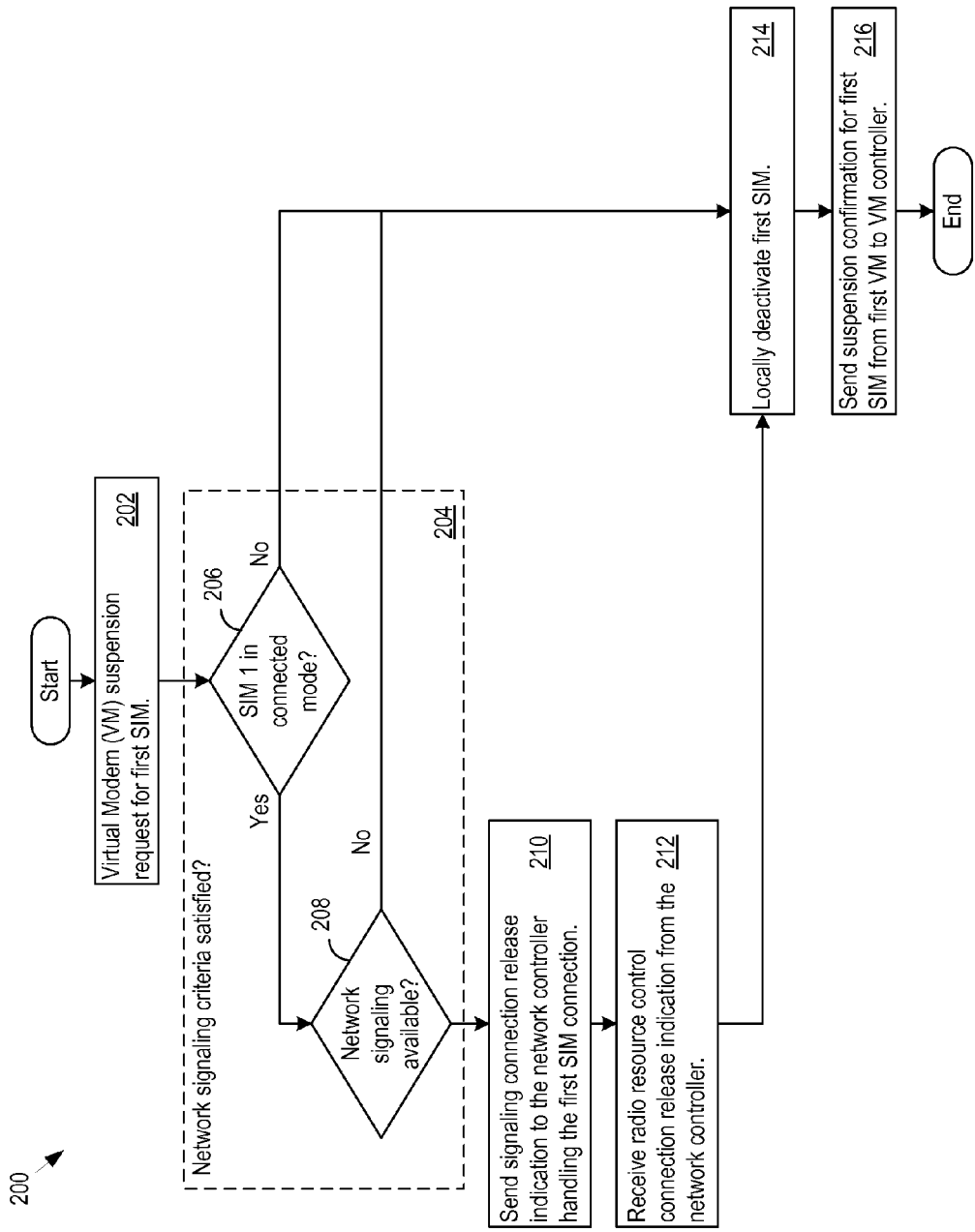
FIG. 2 is an example of logic for suspending a virtual modem.

FIG. 2 is an example of logic 200 for suspending a virtual modem that the system logic 114 may implement. Any VM, such as VM1 126, may receive a virtual modem suspension request from the VMC 124 (202). The request may occur when, for example, the VMC 124 schedules RF interface time for a SIM that is not currently on the RF interface. The VM may respond to the suspension request in several different ways, and chooses among the different suspension options according to suspension decision criteria.

FIG. 2 shows an example in which the suspension decision criteria is a network signaling criteria 204. In this example, the network signaling criteria 204 includes whether the SIM to be suspended is in connected mode (206), and whether network signaling is available (208). If the SIM is in connected mode and network signaling is available, then the VM may execute a first suspension option that includes sending a signaling connection release indication to the network controller (e.g., a radio network controller) handling the SIM connection (210). In other words, the VM may communicate with the network under the first suspension option to gracefully terminate the network connection with the network. The graceful termination may include following any predetermined connection release protocol under any communication standard that applies to the connection.

By gracefully terminating the connection with the network, the VM may assist the network in keeping accurate statistics of connection conditions and network reliability. A network may keep statistics concerning, for example, the drop rate of user equipments based on poor radio conditions. Thus, if the VM does not send a signaling connection release indication to the network controller or gracefully terminate the connection even though the VM is in connected mode and network signaling is available (e.g., radio conditions are suitable for communication), the network may view the VM suspension as a dropped device. In this way, the user equipment 100 helps generate more accurate network statistics with respect to reliability and connection conditions of the network.

In response to the VM executing a first suspension option, the network may communicate a radio resource control (RRC) release indication, such as a connection release, to the user equipment 100. The release indication, e.g., the connection release, is received by the VM (212). If the SIM is not in connected mode or network signaling is not available, then the VM may execute a second suspension option. The second suspension option may forgo sending the signaling connection release indication to the network controller handling the SIM connection, or taking or forgoing some other action that distinguishes the suspension options.

In either case, the VMC 124 may locally deactivate the active SIM, such as by deactivating the VM for the active SIM (214). The VMC 124 may perform the deactivation by providing a deactivation indicator to the VM for the active SIM, for example. The deactivation indicator may vary depending on the implementation, and may include sending a deactivation message to the VM or setting a flag in a register or in other memory, as examples. When it has deactivated, the VM may send a suspension confirmation to the VMC 124 (216).

Locally deactivating the SIM may include artificially creating a situation where the VM for the SIM does not have network coverage. For example, deactivating the SIM may include specifying in the user equipment 100 that according to non access stratum protocol, coverage is unavailable on the VM. Deactivating the SIM may also include preventing the VM from searching for a connection in the access stratum protocol. To accomplish this, the VM may deactivate the virtualized physical layer of the VM (including communication resources managed by the VM) so that the VM ceases connection activity, for example, so that the VM ceases radio activity. Deactivation may result in disconnecting the VM from the physical RF hardware, and releasing or reclaiming resources from the VM.

The system logic 114 may use any other suspension decision criteria to determine among different suspension options for a VM. In addition, there may be additional or different suspension options defined for each VM. Whether network signaling is available (208) may be determined in many different manners. For example, network signaling may be available when the VM can receive (or expect to receive) a response from the network. As another example, network signaling may be considered available when the expected time to complete the signaling connection release is less than the amount of time before the suspended SIM needs access to the RF interface (e.g., to send a high priority message, the sending of which cannot wait longer than some predetermine length of time). If there is not enough time to perform the graceful termination, then the VMC 124 may instead proceed directly to local deactivation of the active SIM (214).

Figure 3:
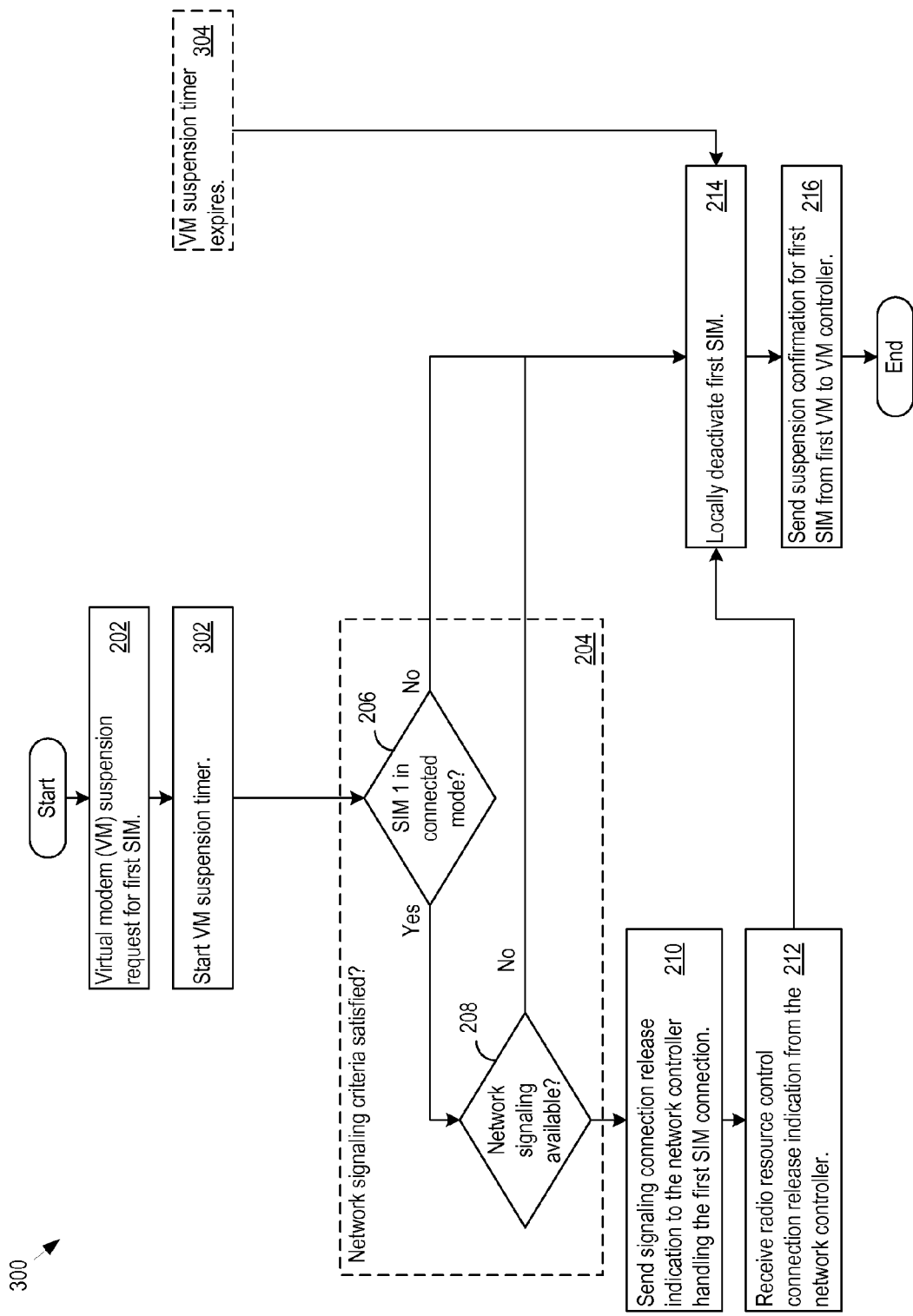
FIG. 3 is another example of logic for suspending a virtual modem.

FIG. 3 is another example of logic 300 for suspending a virtual modem that the system logic 114 may implement. In the example of FIG. 3, the VMC 124 may start a VM suspension timer (302) associated with the suspension activity. For example, the VMC 124 may start the VM suspension timer at the same time or shortly after sending a suspension request to a VM for an active SIM. The suspension timer may guard against overly lengthy execution of any particular suspension option. In the specific example of FIG. 3, the suspension timer runs while the VM attempts to gracefully terminate the connection by sending the signaling connection release indication to the network (210). If for any reason this suspension option takes longer than the suspension timer, then the VM suspension timer will expire (304). When the VM suspension timer expires, the VMC 124 may proceed directly to local deactivation of the active SIM (214).

When the VM suspension timer expires and the VMC 124 has not received a suspension confirmation from the VM to be suspended, the VMC 124 may force suspension of the VM and thereby end the communication activity of the active SIM. As an example, the VMC 124 may issue a forced suspension request to the VM for the active SIM to be suspended. The VM may respond to the forced suspension request by stopping communication activities of the VM (e.g., activity to establish a network connection, communicate a signaling connection release indication to a network controller, or receive a RRC connection release indication from a network controller). The VM may also deactivate the active SIM by locally deactivating communication resources managed by the VM (214). Upon local deactivation, the VM may send a suspension confirmation to VMC 124 (216).

The VMC 124 may set a duration of the VM suspension timer to any desired value. In some implementations, the VMC 124 sets the VM suspension timer to a maximum desired delay for providing access to a suspended SIM. The VM suspension timer value may be provided as a variable in the memory 120 and may be updated as desired by the network or by the user equipment 100. In one implementation, the VMC 124 may stop the VM suspension timer after obtaining the suspension confirmation from the VM.

As another example, the VM suspension timer may be implemented in the VM to be suspended and may be started by the VM upon receiving a suspension request. Here, if VM suspension timer expires before the VM receives a RRC connection release indication from a network controller handling a first SIM connection, the VM may stop communication activity directed to a graceful termination of the first SIM connection. The VM may instead deactivate the active SIM by locally deactivating communication resources managed or controlled by the VM. Also in this example, the VM may stop the VM suspension timer after receiving an RRC connection release indication from the network controller.

Figure 4:
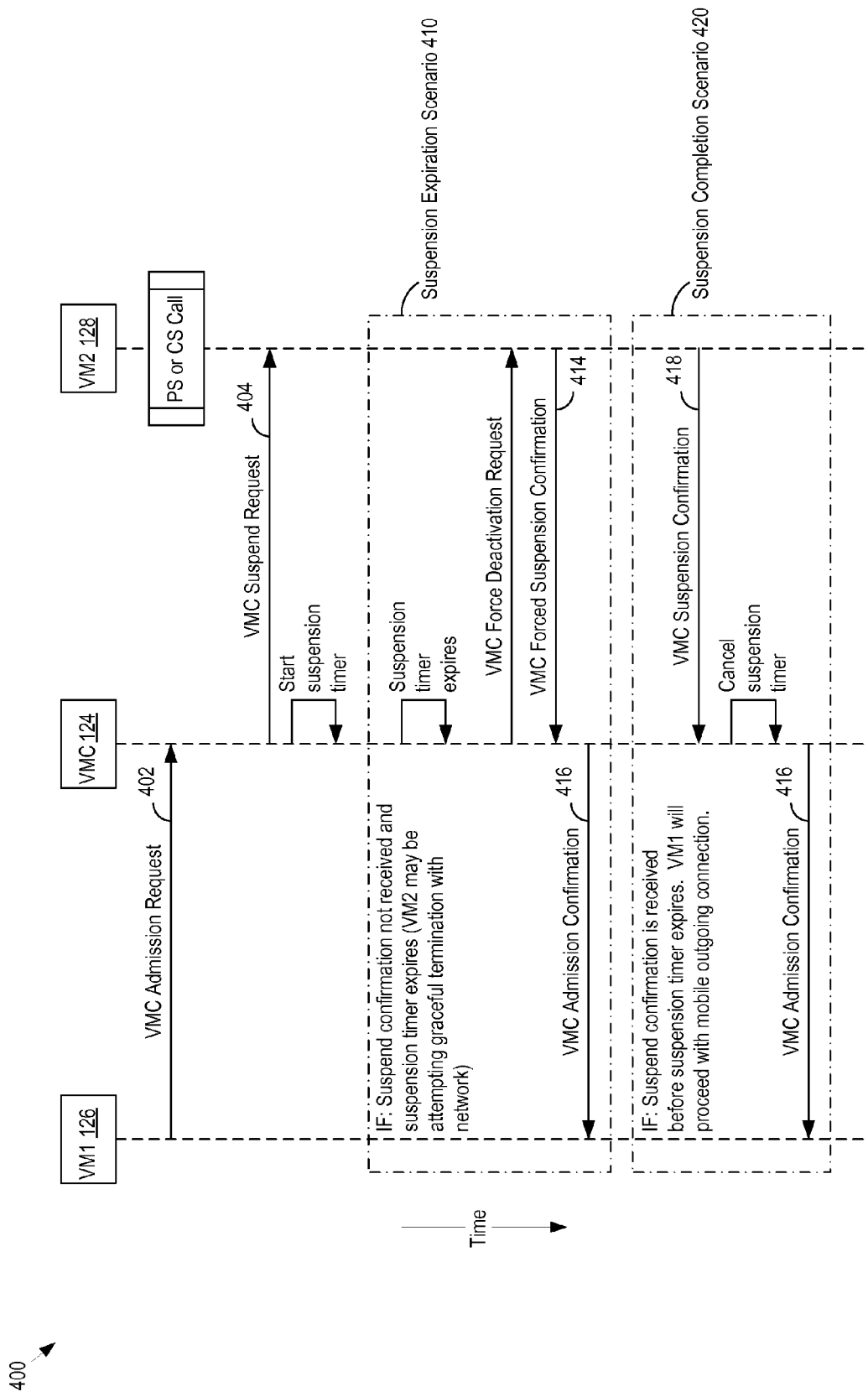
FIG. 4 is an example sequence diagram for virtual modem suspension.

FIG. 4 is an example sequence diagram 400 for virtual modem suspension. The sequence diagram includes the VMC 124, VM1 126, and VM2 128. At the start of the sequence diagram 400, VM1 126 may be in a suspended mode and VM2 128 may be in an active mode, for example performing a packet switched (PS) or circuit switched (CS) call. VM1 126 may send a VMC admission request 402 to the VMC 124. The communications shown in sequence diagram 400 (e.g., 402, 404, 412, 414, 416, and 418) may be implemented in a variety of ways, such as through a function call, a message, or setting flags in memory. The VMC admission request 402 may indicate a request by VM1 126 to enter an active mode to perform a communication using communication resources (e.g., the RF radio). The VMC admission request 402 may also include request parameters indicating a purpose for VM1 126 to request entering into active mode. For example, the VM admission request 402 may indicate VM1 126 requests entering into active mode to handle an incoming CS call directed to VM1 126 (e.g., a voice call).

The VMC 124 may receive the VMC admission request 402 and then send a VMC suspend request 404 to VM2 128. Next, the VMC 124 may start a suspension timer, such as the VMC suspension timer discussed above. A suspension expiration scenario 410 may occur if the VMC 124 does not receive a suspension confirmation from VM2 128 when the suspension timer expires. In this scenario, the suspension timer may expire whereupon the VMC 124 may send a VMC force deactivation request 412 to VM2 128. The VMC force deactivation request 412 may be similar to the forced suspension request described above. VM2 128 may response to the VMC force deactivation request 412 by forcing deactivation of the active SIM, such as locally deactivating communication resources controlled by VM2 128 (e.g., software resources or virtualized communication resources). Then VM2 128 may send a VMC forced suspension confirmation 414 to the VMC 124, which may indicate that the forced suspension of VM2 128 was completed. At this point, the VMC 124 may send a VMC admission confirmation 416 to VM1 126, which may indicate that VM1 126 can enter into active mode.

A suspension completion scenario 420 may occur if the VMC 124 receives a suspend confirmation from VM2 128 before the suspension timer expires. In this scenario, VM2 128 may send a VMC suspension confirmation 418 to the VMC 124. For instance, this may occur when VM2 128 has gracefully terminated a SIM2 network connection and locally deactivated SIM2 before expiration of the suspension timer. In response, the VMC 124 may cancel the suspension timer, for example by stopping the suspension timer. The VMC 124 may then send a VMC admission confirmation 416 to VM1 126.

Figure 5:
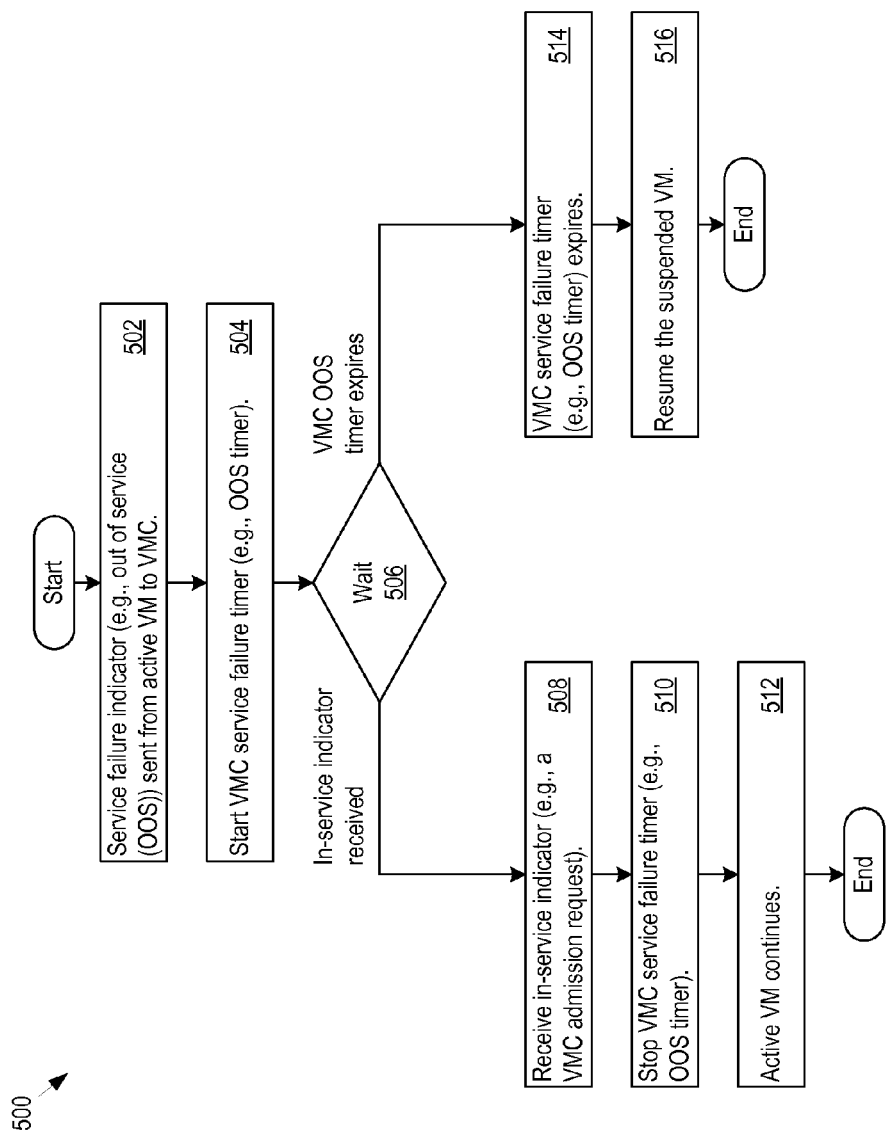
FIG. 5 shows an example of controlling a virtual modem.

FIG. 5 shows an example of logic 500 for controlling a virtual modem. The logic 500 may be implemented by the system logic 114. In the example shown in FIG. 5, the VMC 124 may receive a service failure indicator sent from a VM in active mode (502). A service failure indicator may include an Out-Of-Service (OOS) indicator, which may identify that the active SIM is unable to communicate with a network. In response, the VMC 124 may start a VMC service failure timer (e.g., OOS timer) (504). The VMC 124 may then wait (506) until either the VMC service failure timer expires or an in-service indicator is received by the VMC 124 before expiration of the VMC service failure timer. The VMC service failure timer may guard against frequent toggling of physical communication resources between SIMs when the service failure of the active SIM is temporary or short in duration, saving power and resources of the user equipment 100. The VMC 124 may allow a suspended VM to enter an active mode for use of communication resources upon expiration of the VMC service failure timer.

The VMC 124 may receive an in-service indicator from the VM for the active SIM before expiration of the VMC service failure timer (508). Examples of an in-service indicator may include an in-service message sent from the active VM, such as the VMC admission request 402. In response to receiving the in-service indicator, the VMC 124 may stop the VMC service failure timer (510) and the active VM may continue communication activity (512).

In another scenario, the VMC service failure timer may expire (514). In response, the VMC 124 may suspend communication activity of the active SIM. For example, the VMC 124 may issue a suspend command (e.g., the VMC suspend request 404) to the active SIM. The VMC 124 may also resume communication activity of a suspended SIM (516), for example by issuing a suspend request to the active SIM and issuing an activation message to the suspended SIM.

The VMC 124 may set a duration of the VMC OOS timer to any desired value. In some implementations, the VMC 124 sets the VMC OOS timer as a predicted temporary service failure value, which may be reflective of predicted out-of-service times for outage scenarios, such as time to traverse a fade or dead space, the time taken when an active SIM changes network cells, when the user equipment 100 is in an elevator, where there are intermittent outages of a network, or any other predicted, estimated, or measured times. The VM suspension timer value may be provided as a variable in the memory 120 and may be updated as desired by the network or by the user equipment 100.

Figure 6:
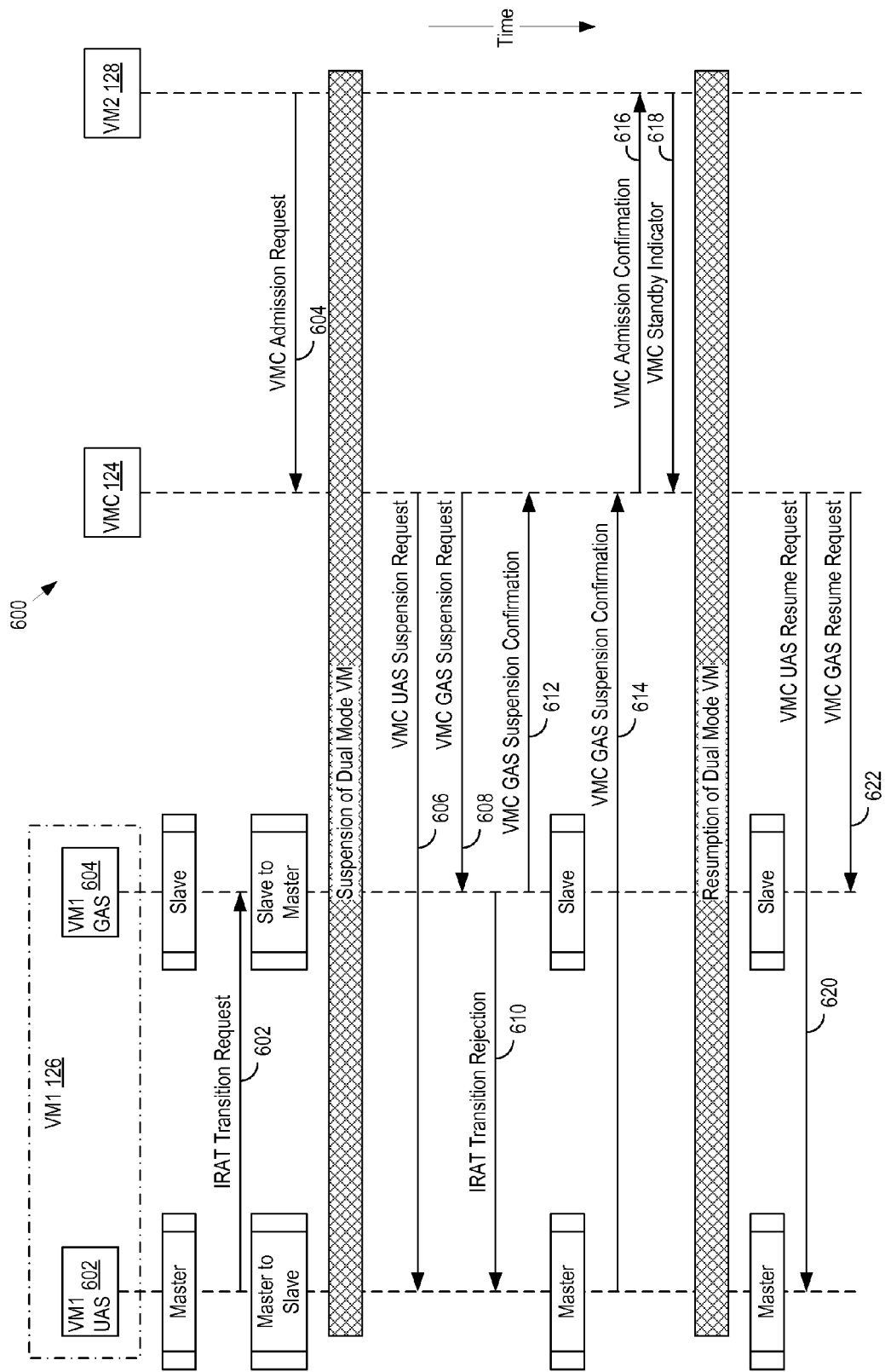
FIG. 6 shows an example sequence diagram for controlled suspension and resumption of virtual modems.

FIG. 6 shows an example sequence diagram 600 for controlled suspension and resumption of virtual modems. The sequence diagram 600 includes the VMC 124, VM1 126, and VM2 128. Within a virtual modem, different radio access technologies (RATs) may be implemented. Even though a virtual modem may communicate across a single RAT, multiple RATs of a virtual modem may be activated simultaneously. For example, a virtual modem may activate multiple radio resource (RR) instantiations when transitioning from one RAT to another RAT. In FIG. 6, VM1 126 may include a VM1 UMTAS Access Stratum (UAS) radio receiver (RR) 602 configured to communicate across a first RAT and a VM1 FSM Access Stratum (GAS) RR 604 configured to communicate across a second RAT. The RAT RR that a virtual machine currently communicates across may be identified as the master RR while the other RAT RRs not being used by the virtual modem may be referred to as slave RRs. Master/slave status of a RR may be stored in a memory or as a parameter associated with logic of each RR. As seen in the sequence diagram 600, the VM1 UAS RR 602 is initially configured as the master RR and the VM1 GAS RR 604 is initially configured as a slave RR.

By simultaneously activating multiple RAT RRs, a virtual modem may transition from communicating through a source RAT RR to communicating through a target RAT RR. Depending on network coverage of each of the RATs, VM1 126 may elect to transition from communicating through the VM1 UAS RR 602 across the first RAT to communicating through VM1 GAS RR 604 across the second RAT. As one way to initiate an Inter-RAT (IRAT) transition process, the VM1 UAS RR 602 may send an IRAT transition request to the VM1 GAS RR 604, such as the IRAT transition request 602. The IRAT transition request 602 may indicate that VM1 124 will transition to communicate through the VM1 GAS RR 604, eventually making the VM1 GAS RR 604 the master RR upon completion of the IRAT transition process. Also upon completion of the IRAT transition process, the VM1 UAS RR 602 will become a slave RR. Thus, the IRAT transition process may proceed as shown in FIG. 6 through the VM1 UAS RR 602 transitioning from master RR to slave RR and the VM1 GAS RR 604 transitioning from slave RR to master RR.

During the IRAT transition process, the VM1 UAS RR 602 may be identified as the source RR (e.g., the RAT RR the virtual modem previously communicated across) and the VM1 GAS RR 604 may be identified as the target RR (e.g., the RAT RR the virtual modem will subsequently communicate across). The IRAT transition process may include an exchange of information between the source RR and the target RR. For example, the source RR may provide network timing information, network channel assignment information, network connection information, or network cell information. The target RR may also provide an IRAT transition confirmation indication to the source RR, which may indicate that the target RR has connected to a network or that the virtual modem has successfully transitioned to communicating across the target RAT RR. The IRAT transition process may be completed once the source RR receives a IRAT transition confirmation indication from the target RR.

During the IRAT transition process, however, the VMC 124 may send a suspend request to VM1 126. For example, during the IRAT transition process on VM1, VM2 128 may send a VMC admission request 604 to the VMC 124 requesting use of a radio RF. The VMC 124 may grant the VMC admission request 604 and subsequently send a suspend request to VM1 126. As VM1 124 is undergoing an IRAT transition process, both the VM1 UAS RR 602 and the VM1 GAS RR 604 may be active. As such, both RRs may require suspension. To that end, when a virtual modem undergoing an IRAT transition process is to be suspended, the VMC 124 may send a suspension request to both the source RR (e.g., VM1 UAS RR 602) and the target RR (e.g., VM1 GAS RR 604). In the example shown in FIG. 6, the VMC 124 sends a VMC UAS suspension request 606 to the VM1 UAS RR 602 and a VMC GAS suspension request 608 to the VM1 GAS RR 604.

In another embodiment, the VMC 124 may send a suspension request to each RAT RR of a VM that the VM is capable of communicating across each time the VM is to be suspended. For example, VM1 126 may be capable of communicating using UMTS and GSM technologies. Thus, the VMC 124 may send a suspension request to both VM1 UAS RR 602 and VM1 GAS RR 604 during the suspension process of VM1 126 regardless of whether VM1 126 is undergoing an IRAT transition process or not (as indicated in FIG. 6 as the suspension of a dual mode VM).

Upon resumption of VM1 126 (e.g., after VM2 128 has completed its access to the RF interface), VM1 126 may be unable to properly resume connection to a network if a master RR is not clearly identified. Recall that the VMC 124 suspended VM1 126 during a transition between RRs. To facilitate resumption, therefore, the VM1 UAS RR 602 and the VM1 GAS RR 604 may determine, prior to suspension, which of the two RRs will serve as the master RR upon resumption of VM1 126.

One way that the VM 126 may accomplish the resumption is for the target RR to wait to receive an indication from the source RR as to whether the IRAT transition request 602 was confirmed or rejected by the target RR. In one implementation, if the target RR receives a suspension request from the VMC 124 prior to meeting an IRAT transition criteria, the target RR may abort the IRAT transition process and send an IRAT transition rejection indication to the target RR. The IRAT transition criteria may include whether the target RR has yet successfully connected to a network (e.g., by receiving a network connection confirmation message from a network controller) or whether the target RR has transmitted an IRAT transition confirmation indication to the source RR.

In this way, whether the source RR or the target RR will act as the master RR upon resumption of a virtual modem may depend on whether the target RR has met the IRAT transition criteria prior to receiving a suspension request from the VMC 124. To illustrate, in the timing sequence 600 shown in FIG. 6, The VM1 GAS RR 604 (the target RR) may receive the VMC GAS suspension request 608. When this suspension request is received, the VM1 GAS RR 604, the target RR, has not met the IRAT transition criteria. For example, the VM1 GAS RR 604 may not have yet successfully negotiated with the network to transition the connection to the RAT supported by the target RR or may not have sent an IRAT transition confirmation indication to the VM1 UAS RR 602 (source RR) at the time the VMC GAS suspension request 608 was received. In this case, the VM1 GAS RR 604 may abort the IRAT transition process, transmit an IRAT transition rejection indication 610 to the VM1 UAS RR 602, and indicate that the VM1 UAS RR 602 will act as a slave RR upon resumption of VM1 126 (e.g., through a memory value or status register, sending a message to the source RR, or in some other way). The VM1 GAS RR 604 may also execute a VM suspension process and send the VMC GAS suspension confirmation 612 to the VMC 124 once suspension activity has completed.

The VM1 UAS RR 602 may receive the IRAT transition rejection indication 610 from the VM1 GAS RR 604, which may indicate that the IRAT transition process was not completed. Accordingly, the VM1 UAS RR 602 may indicate that it will serve as the master RR upon resumption of VM1 126. The VM1 UAS RR 602 may then execute a VM suspension process and send the VMC UAS suspension confirmation 614 to the VMC 124 once suspension activity has completed.

In the alternative scenario, the target RR (e.g., the VM1 GAS RR 604) may complete the IRAT transition criteria prior to receiving a suspension request from the VMC 124. For example, the VM1 GAS RR 604 may have successfully negotiated the RAT change with the network or may have sent an IRAT transition confirmation indication to the VM1 UAS RR 602, prior to receiving the VMC GAS suspension request 608. In this situation, as the IRAT transition criteria has been completed by the target RR, the VM1 GAS RR 604 may send an IRAT transition confirmation indication to the source RR. The target RR VM1 GAS RR 604 may indicate that it will serve as the master RR upon VM resumption (e.g., altering a memory value or parameter storing master/slave RR status) and execute the suspension process. The source RR VM1 UAS RR 602 may receive the IRAT transition confirmation indication and, in response, identify that it will serve as a slave RR upon VM resumption. Then, the source RR may execute the suspension process.

Referring back to the example shown in FIG. 6, upon receiving suspension confirmations from both VM1 RAT RRs, the VMC 124 may send a VMC admission confirmation 616 to VM2 128 indicating that VM2 128 may enter active mode and use the RF communication resources of the communication interface 112. At a later time, when VM2 128 has completed communication activity or use of the radio resources, VM2 128 may send a VMC standby indicator 618 to the VMC 124 which may indicate that VM2 128 will enter into a standby mode. At this point, the VMC 124 may resume communication activity on VM1 124. As the VMC 124 may be unaware which of the VM1 RAT RRs will serve as master RR upon resumption of VM1 126, the VMC 124 may send resume requests to both VM1 RAT RRs (e.g., Resumption of Dual Mode VM). The VMC 124 may send a VMC UAS resume request 620 to the VM1 UAS RR 602 and a VMC GAS resume request 622 to the VM1 GAS RR 604. Based on indications determined prior to suspension, the VM1 UAS RR 602 may serve as the master RR upon resumption and the VM1 UAS RR 604 may serve as the slave RR.

Figure 7:
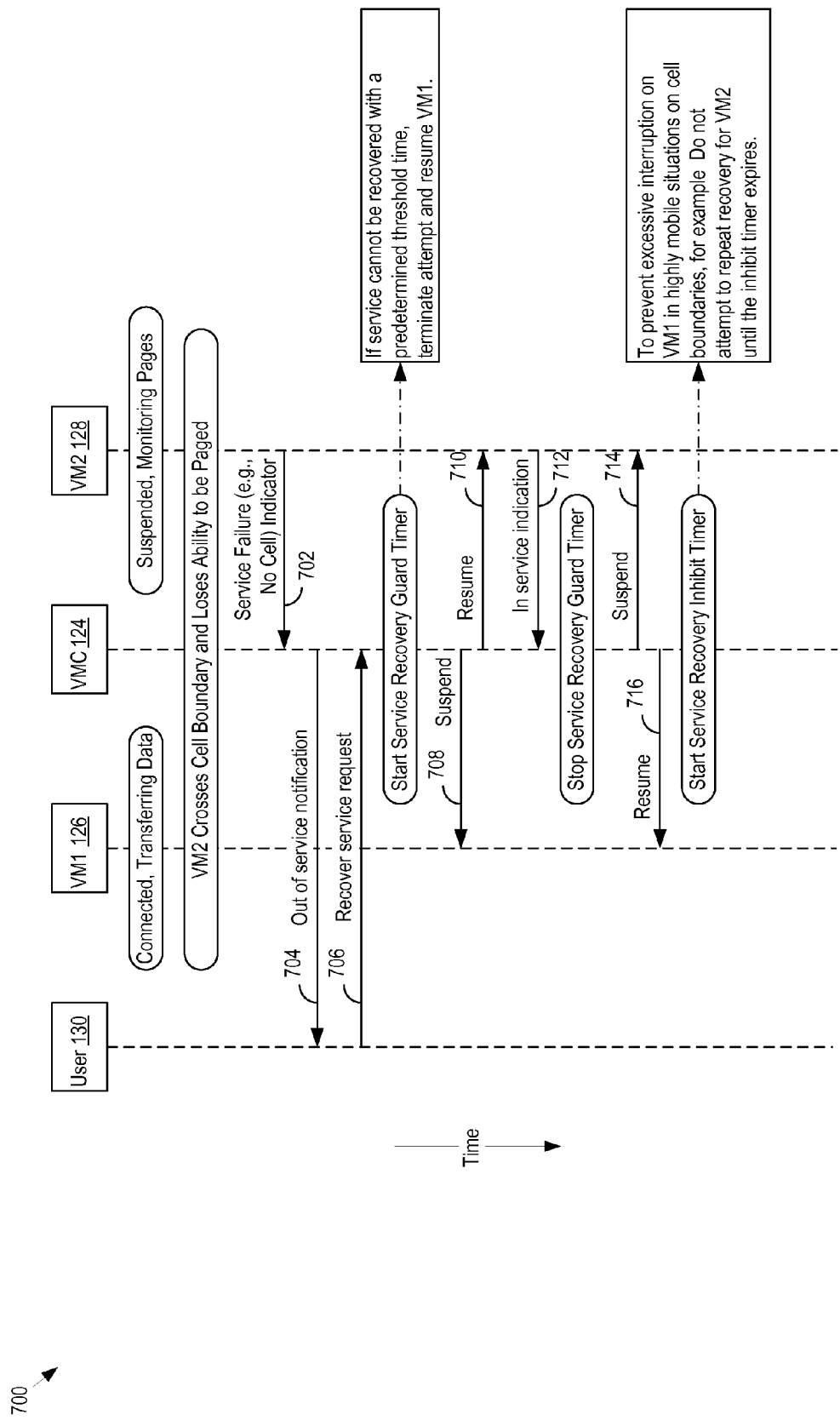
FIG. 7 shows another example sequence diagram for controlling suspension and resumption of virtual modems.

FIG. 7 shows another example sequence diagram 700 for controlling suspension and resumption of virtual modems. The sequence diagram 700 shown in FIG. 7 includes a VMC 124, VM1 126, VM2 128, and a user 130. Due to user mobility, the user 130 (and the user equipment 100) may cross network cell boundaries that may cause a suspended SIM to lose a network connection or improperly monitor or transmit data. In this situation, the VMC 124 may interrupt an active SIM and allocate a portion of time for the suspended VM to use communication resources of a user equipment 100 to reacquire a network connection. The description below focuses on background paging monitoring of a suspended SIM, but the VMC 124 suspend an active VM and allow a suspended VM use of the communication resources for any reason to support proper operation of the suspended VM and its associated SIM.

Initially, VM1 124 may be in active mode and an associated SIM (e.g., SIM1 102) may be actively communicating through a communication resource of the user equipment 100 (e.g., the communication interface 112). VM2 128 may be in a suspended mode and monitoring paging in the background of the active SIM1 connection. To monitor paging, VM2 128 may monitor a paging channel of a network cell to check for paging indicators directed to SIM2.

VM2 128 may experience a service failure that affects the ability of VM2 128 to monitor pages. For example, due to user mobility, the user equipment 100 may cross a cell boundary of the network VM2 128 is monitoring pages from. In this situation, VM2 128 may continue to monitor the paging channel assigned by the previous network cell. In other words, VM2 128 may no longer be tuned to monitor the correct paging channel and will no longer be able properly receive pages. As such, VM2 128 may detect that it is no longer monitoring the correct paging channel and notify the VMC 124. In one example, VM2 128 may transmit a service failure indicator 702 to the VMC 124 indicating that VM2 128 has lost coverage with the network or network cell. As VM1 126 is in active mode, VM2 128 may not have access to communication resources of the user equipment 100 in order to reacquire the network and tune to the correct paging channel.

In one implementation, the VMC 124 may receive feedback from a user 130 as to whether to recover the network connection or network service for VM2 128. The VMC 128 may send a displaying service failure notification regarding VM2 128 and SIM2 104 through the user interface 118. For example, the VMC 124 may cause an out of service notification 704 to be displayed. The user 130 may send a response to the service failure notification, such as a receive a recover service request input 706 from the user 130 that may indicate the user 130 requests network service for VM2 128 be restored. The VMC 124 may also inhibit starting the service recovery guard timer and inhibit transitioning use of the communication interface to VM2 128 until the recover service request input 706 is received from the user 130.

Upon receiving an indication from the user 130 to proceed, the VMC 124 may then start a service recovery guard timer. The service recovery guard timer may guard against execution of the service recovery for VM2 128 that exceeds a predetermined execution time. The VMC 124 may then send a suspend message 708 to VM1 126 and a resume message 710 to VM2 128, which may respectively instruct VM1 126 to enter a suspended mode and VM2 128 to enter an active mode, allowing VM2 128 to recover network service, acquire updated paging channel information, and properly monitor paging indicators. Once VM2 128 has successfully established a connection with the network, VM2 128 may send an in service indication 712 to the VMC 124. The in-service indication 712 may indicate that VM2 128 has established a network connection or is now properly monitoring paging. Upon receiving the in service indication 712, the VMC 124 may stop the service recovery guard timer. The VMC 124 may then send a suspend message 714 to VM2 128 and then a resume message 716 to VM1 126, as shown in FIG. 7. The VMC 124 may wait until receiving a suspend confirmation message from VM2 128 before sending the resume message 716 to VM1 124.

In another implementation, upon receiving the in service indication 712 from VM2 128, the VMC 124 may allow VM2 128 to remain in active mode until a further time, e.g., until the VMC 124 receives an admission request from VM1 126. Upon receiving the admission request from VM1 126, the VMC 124 may then send the suspend message 714 to VM2 128 and then the resume message 716 to VM1 126.

In another scenario, the service recovery guard timer may expire before VM2 128 successfully establishes a network connection. As an example, VM2 128 may experience difficulty communicating with network cells based on the location of the user equipment 100, such as a location between cell boundaries. The longer VM2 128 remains active, the greater the potential impact on the VM1 124 PS or CS call that was interrupted to allow VM2 128 to recover network service. If the time VM2 128 remains active long enough, a VM1 124 CS call may be dropped or a VM1 124 PS call may experience throughput degradation. Thus, the service recovery guard timer prevents overly lengthy network service recovery by VM2 128.

To that end, the VMC 124 may suspend VM2 128 and resume VM1 124 if the VMC 124 has not received an indication that VM2 128 has successfully recovered network service upon expiration of the service recovery guard timer. As an example, the VMC 124 may suspend VM2 128 resume VM1 124 if the VMC 124 has not received an in service indication 712 or similar message from VM2 128 before expiration of the service recovery guard timer. Alternatively, upon expiration of the service recovery guard timer, the VMC 124 may wait to suspend VM2 until an admission request is received from VM1 126.

If the service recovery guard timer expires before VM2 128 recovers network service, VM2 128 may still be experiencing a service failure, such as an inability to connect to a network. In that situation, VM2 128 may be able to send another service failure indicator 702 to the VMC 124 and repeat the service recovery process again. To inhibit a suspended SIM repeatedly requesting active mode and use of the communication resources in this situation, the VMC 124 may start a recovery inhibit timer. For example, the VMC 124 may start the recovery inhibit timer once the VMC 124 identifies that the service recovery guard timer expired. Alternatively, the VMC 124 may start the recovery inhibit timer When the recovery inhibit has not expired, the VMC 124 may prevent starting the service recovery guard timer, prevent VM2 128 from entering active mode, and prevent transitioning of communication resources to SIM2 104.

Any of the various timers disclosed above and below (e.g., the service recovery guard timer, the recovery inhibit timer, the VMC service failure timer, the VM suspension timer, etc.) could alternatively be implemented as counters (e.g., no more than 3 attempts to get in-service in a 5 minute period), or with other timing or counting control mechanisms.

As another example, the VMC 124 may start the recovery inhibit timer when VM1 126 has resumed communication in active mode or when the communication interface 112 has been transitioned back for use by VM1 126 and SIM1 102. This may prevent VM2 128 from repeatedly requesting use of the user equipment 100 communication resources when the user 130 or the user equipment 100 is rapidly moving between cell boundaries. In this situation, the VMC 124 may prevent VM2 128 from entering active mode in response to receiving a service failure indicator 702 until the recovery inhibit timer expires. In other words, when the recovery inhibit timer has not expired, the VMC 124 may prevent transitioning communication resources (e.g., the communication interface 112) for use by SIM2 104 when VM2 128 sends a service failure indicator 702 to the VMC 124. In one implementation, the VMC 124 may retry the service recovery process of VM2 128 once the recovery inhibit timer expires. For example, after the inhibit recovery timer expires, the VMC 124 may start the service recovery guard timer, send a suspend message 708 to VM1 126 and a resume message 710 to VM2 128, allowing VM2 128 to recover network service, acquire updated paging channel information, and properly monitor paging indicators.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
   a communication interface;
   a first subscriber identity module (SIM) interface for a first SIM;
   logic in communication with the first SIM interface and the communication interface, the logic operable to suspend communication activity by the first SIM by:
   determining whether a network signaling criteria is satisfied;

when the network signaling criteria is satisfied, communicating, through the communication interface, a signaling connection release indication to a network controller handling a first SIM network connection supporting the communication activity; and when the network signaling criteria is not satisfied, forgoing communicating the signaling connection release indication to the network controller handling the first SIM network connection supporting the communication activity; and locally deactivating a communication resource associated with the first SIM regardless of whether the signaling connection release indication was sent.

2. The system of claim 1, where the logic is further operable to:

start a suspension timer when suspending the communication activity by the first SIM; and when the suspension timer expires and the logic has not received a suspension confirmation:

force suspension of the communication activity by the first SIM.

3. The system of claim 2, where the logic is operable to force suspension by:

issuing a forced suspension request to a virtual modem for the first SIM.

4. The system of claim 3, where the virtual modem is operable to respond to the forced suspension request by:

stopping network termination activities of the first SIM, deactivating communication resources managed by the virtual modem, or both.

5. The system of claim 4, where the virtual modem is further operable to:

provide the suspension confirmation.

6. The system of claim 2, where the logic is further operable to:

stop the suspension timer after obtaining the suspension confirmation.

7. The system of claim 1, where the system further comprises:

a second subscriber identity module (SIM) interface for a second SIM; and where the logic is further operable to:

obtain a suspension confirmation; and transition from the communication activity by the first SIM to communication activity by the second SIM.

8. A method comprising:

in a mobile device comprising a first subscriber identity module (SIM):

suspending communication activity by the first SIM by:

determining whether a network signaling criterion is satisfied;

when the network signaling criteria is satisfied:

communicating a signaling connection release indication to a network controller handling a first SIM network connection supporting the communication activity; and when the network signaling criteria is not satisfied:

forgoing communicating the signaling connection release indication to the network controller handling the first SIM network connection supporting the communication activity; and locally deactivating a communication resource associated with the first SIM regardless of whether the signaling connection release indication was sent.

9. The method of claim 8, further comprising:

starting a suspension timer when suspending of the communication activity by the first SIM; and when the suspension timer expires without having received a suspension confirmation:

forcing suspension of the communication activity by the first SIM.

10. The method of claim 9, where forcing the suspension comprises issuing a forced suspension request to a virtual modem for the first SIM.

11. The method of claim 10, where issuing the forced suspension request causes the virtual modem to stop a network termination activity of the first SIM, deactivate a communication resource managed by the virtual modem, or both.

12. The method of claim 11, further comprising receiving the suspension confirmation from the virtual modem after the virtual modem stops the network termination activity, deactivates the communication resource, or both.

13. The method of claim 9, further comprising stopping the suspension timer when the suspension confirmation is received before expiration of the suspension timer.

14. The method of claim 8, further comprising:

obtaining a suspension confirmation after suspending the communication activity by the first SIM; and transitioning a communication interface to a second SIM of the mobile device.

15. A product comprising:

a non-transitory computer readable medium storing instructions that, when executed by a processor, cause the processor to:

suspend communication activity by a first subscriber identity module (SIM) by:

determining whether a network signaling criterion is satisfied;

when the network signaling criteria is satisfied:

communicating a signaling connection release indication to a network controller handling a first SIM network connection supporting the communication activity; and when the network signaling criteria is not satisfied:

forgoing communicating the signaling connection release indication to the network controller handling the first SIM network connection supporting the communication activity; and locally deactivating a communication resource associated with the first SIM regardless of whether the signaling connection release indication was sent.

16. The product of claim 15, where the instructions further cause the processor to:

start a suspension timer when suspending the communication activity by the first SIM; and when the suspension timer expires without having received a suspension confirmation:

force suspension of the communication activity by the first SIM.

17. The product of claim 16, where the instructions cause the processor to force the suspension by issuing a forced suspension request to a virtual modem for the first SIM.

18. The product of claim 17, where issuing the forced suspension request causes the virtual modem to stop a network termination activity of the first SIM, deactivate a communication resource managed by the virtual modem, or both.

19. The product of claim 18, where the instructions further cause the processor to:

receive the suspension confirmation from the virtual modem after the virtual modem stops the network termination activity, deactivates the communication resource, or both.

20. The product of claim 16, where the instructions further cause the processor to:

stop the suspension timer when the suspension confirmation is received before expiration of the suspension timer.

* * * * *